(12) United States Patent
Petruk

(10) Patent No.: US 7,640,796 B2
(45) Date of Patent: Jan. 5, 2010

(54) WIND TUNNEL

(76) Inventor: Victor Petruk, Street Trostyanetskaya 6-b apt. 62, Klyv (UA) 02091

( * ) Notice: Subject to any disclaimer, the term of this patent is extended or adjusted under 35 U.S.C. 154(b) by 218 days.

(21) Appl. No.: 11/921,198

(22) PCT Filed: May 23, 2006

(86) PCT No.: PCT/UA2006/000029

§ 371 (c)(1),
(2), (4) Date: Nov. 28, 2007

(87) PCT Pub. No.: WO2006/130125

PCT Pub. Date: Dec. 7, 2006

(65) Prior Publication Data

US 2009/0277263 A1 Nov. 12, 2009

(30) Foreign Application Priority Data

May 30, 2005 (UA) ............................. 2005005083

(51) Int. Cl.
*G01M 9/00* (2006.01)
(52) U.S. Cl. ....................................... 73/147
(58) Field of Classification Search ........................ None
See application file for complete search history.

(56) References Cited

U.S. PATENT DOCUMENTS 3,866,466 A * 2/1975 Cotter .......................... 73/147
5,495,754 A * 3/1996 Starr et al. ..................... 73/147
6,155,111 A * 12/2000 Wickern et al. ............... 73/147
6,378,361 B1 * 4/2002 Larsen et al. .................. 73/147
6,694,808 B2 * 2/2004 Sawada et al. ................ 73/147
6,725,912 B1 * 4/2004 Moll et al. ................... 165/144

FOREIGN PATENT DOCUMENTS

DE 2522371 12/1976
JP 10160617 6/1998
SU 326474 1/1972

* cited by examiner

*Primary Examiner*—Lisa M Caputo
*Assistant Examiner*—Jermaine Jenkins
(74) *Attorney, Agent, or Firm*—Aleksandr Smushkovich

(57) ABSTRACT

The invention relates to closed-circuit tunnels used for aerodynamic researches, sportsmen-parachutists training and other purposes. The inventive closed-circuit tunnel comprises a confuser, a working area, a diffuser, one or several return channels, a blower unit and turning bends having different flow deflection angle, wherein the bend having the smaller flow deflection angle is placed in a high-speed flow cross-section, whereas the bend having the greater flow deflection angle is arranged in a low flow speed cross-section. In a preferred embodiment, the tunnel comprises a first turning bend containing one turning gut for turning the airflow at 60 degrees, a second turning bend containing two turning guts for turning the airflow at 120 degrees, and a third turning bend containing three turning guts for turning the airflow at 180 degrees. The invention makes it possible to reduce air pressure losses, the drive power and a specific amount of metal per structure.

2 Claims, 1 Drawing Sheet

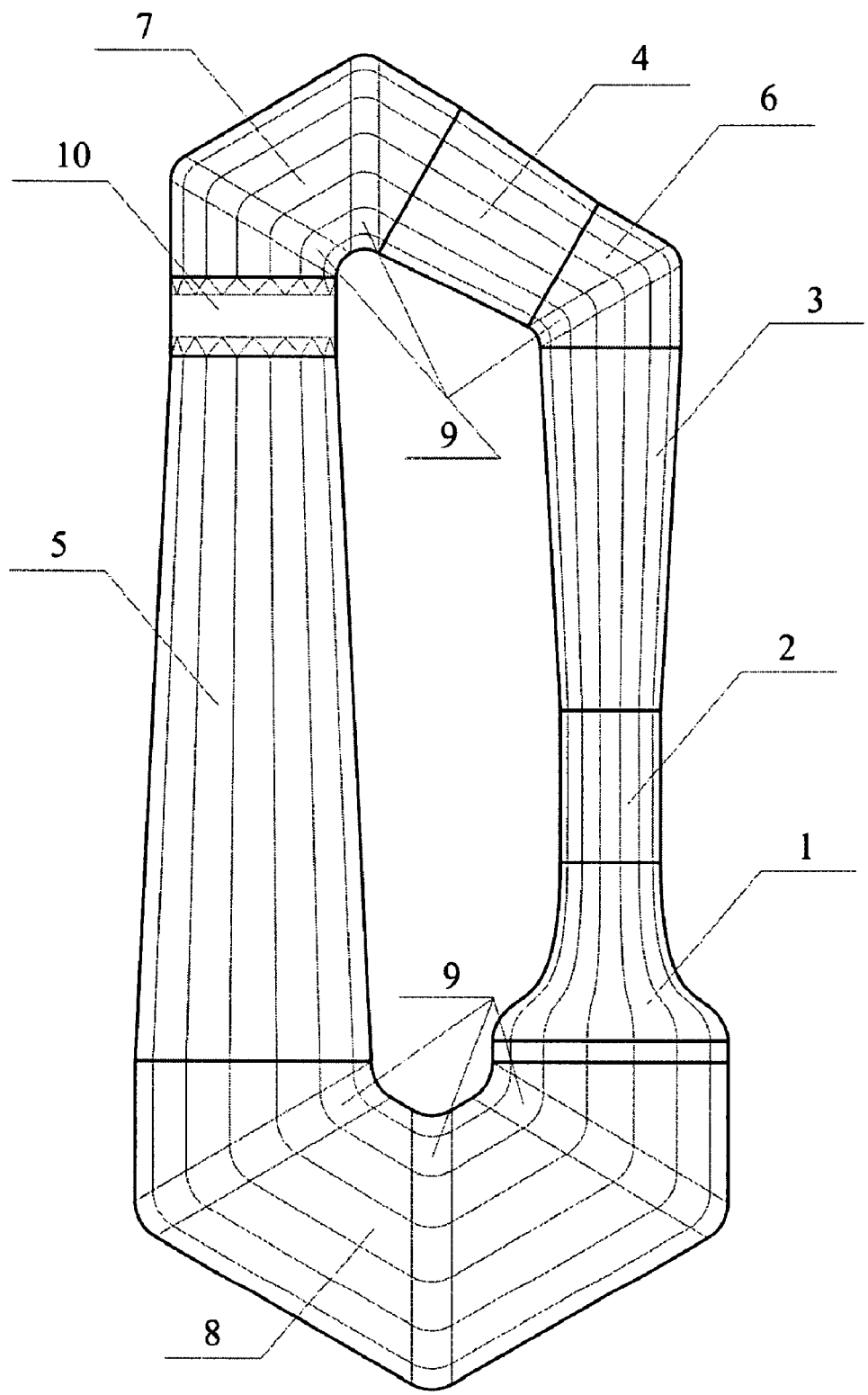
FIG.

WIND TUNNEL

CROSS-REFERENCE TO RELATED APPLICATIONS

This application is a U.S. national phase application of a PCT application PCT/UA2006/000029 filed on 23 May 2006, published as WO2006/130125, whose disclosure is incorporated herein in its entirety by reference, which PCT application claims priority of a Ukrainian patent application UA2005/05083 filed on 30 May 2005.

FIELD OF THE INVENTION

The present invention relates to aerodynamics and can be used in designing wind tunnels. Particularly, the invention is dedicated to closed-circuit tunnels used for aerodynamic researches, sportsmen-parachutists training and for other purposes.

BACKGROUND OF THE INVENTION

Every known return-flow wind tunnel contains a confuser, a test section, a diffuser, a blower unit, one or several return channels, and turning bends that are used to form a closed loop. The turning bend may be designed as a smooth arc-shaped section for turning airflow through 180 degrees [1, p. 64] or as an elbow bend for turning airflow through 90 degrees. In the latter case, the air channel section between the first turning bend and the second turning bend may be designed with a cylindrical or prismatic cross-section [1, p. 60] or as a diffuser section.

The most close to the proposed wind tunnel is a return-flow wind tunnel containing a confuser, a test section, a diffuser, a return channel, a blower unit, and four 90-degree turning bends with the diffuser section arranged between the first turning bend and the second turning bend [2, p. 11].

The disadvantage of the prior art wind tunnel is a significant air pressure loss due to an inefficient arrangement of the wind tunnel elements. The first turning bend and the second turning bend are main sources of the air pressure loss in the wind tunnel circuit and induce a large air pressure loss in the diffuser. This feature is due to the fact that, in order to reduce the air pressure loss in the turning bends, it is necessary to reduce the airflow velocity in the turning bends by increasing the area ratio of the diffuser. As a result, the air pressure loss in the diffuser would increase. Additionally, the increase of the area ratio of the diffuser is associated with the increase of the length of the diffuser and, as a result, with the increase of the overall dimensions of the wind tunnel and the increase of materials consumption in constructing the wind tunnel.

BRIEF DESCRIPTION OF THE INVENTION

The purpose of the present invention is to construct a return-flow wind tunnel with low air pressure loss that results in reduced power for driving the wind tunnel blower unit and reduced materials consumption (a specific amount of metal per structure) in constructing the wind tunnel.

This purpose is achieved by that the known return-flow wind tunnel with a confuser, a test section, a diffuser, a return channel, and a blower unit comprises turning bends designed so that at least the first turning band and the second turning bend have different airflow turning (deflection) angles. The turning bend with a minor airflow turning angle is installed in the section with the larger airflow velocity, and the turning bend with a larger airflow turning angle is installed in the section with the lesser airflow velocity.

As the air pressure loss in a turning bend depends on the airflow turning angle [2, p. 161], the air pressure loss coefficient for the turning bend with the larger airflow turning angle would decrease, the air pressure loss coefficient for the turning bend with the lesser airflow turning angle would increase, and the total air pressure loss coefficient for both the turning bends would increase in comparison with the prior art wind tunnel.

As air pressure loss is directly proportional to the squared local velocity, the total airflow loss corresponding to the defined pressure recovery factor in the diffuser section between the first turning bend and the second turning bend would decrease because the main part of the total airflow loss coefficient for the turning bands corresponds to the section of the wind tunnel circuit with lesser flow velocity. Additionally, the reduction of the airflow loss coefficient for the first turning bend provides a possibility to increase the airflow velocity in the area of this turning bend and, as a result, to reduce the area ratio and the length of the diffuser in order to reduce the air pressure loss in the diffuser, the overall dimensions of the diffuser, and the materials consumption in constructing the wind tunnel.

PREFERRED EMBODIMENT OF THE INVENTION

While the invention may be susceptible to embodiment in different forms, there is shown in an appended drawing FIGURE (FIG.), and will be described in detail herein, a specific embodiment of the present invention, with the understanding that the present disclosure is to be considered an exemplification of the principles of the invention, and is not intended to limit the invention to that as illustrated and described herein.

For the purpose to reduce the airflow loss coefficient for the turning bends with a flow turning angle more than 90 degrees, the turning bend may contain several turning guts. Specifically, the wind tunnel may contain turning bends with turning guts, each of which can turn the airflow at an angle of 60 degrees. The first turning bend contains one turning gut for turning the airflow at 60 degrees, the second turning bend contains two turning guts for turning the airflow at 120 degrees, and the third turning bend contains three turning guts for turning the airflow at 180 degrees (see the appended FIG. that illustrates a schematic sectional view of the inventive wind tunnel).

The proposed return-flow wind tunnel comprises a confuser, a test section, at least one diffuser, at least one return channel, a blower unit, and turning bends, of which at least a first turning bend and a second turning bend have different angles of the airflow turn. The turning bend with a minor airflow turning angle is installed in a section with the larger airflow velocity, and the turning bend with a larger airflow turning angle is installed in the section with the lesser airflow velocity. The aforesaid confuser, test section, at least one diffuser, at least one return channel, blower unit, and at least two turning bends are interconnected in a closed loop.

In a preferred embodiment, each of the turning bends contains turning guts with an airflow turning angle of 60 degrees. The first turning bend contains one turning gut for turning the airflow at 60 degrees, the second turning bend contains two turning guts for turning the airflow at 120 degrees, and the third turning bend contains three turning guts for turning the airflow at 180 degrees.

The proposed wind tunnel is distinctive from the prior art wind tunnel by:

using, in the wind tunnel circuit, turning bends with different airflow turning angles, arranged so that the turning bend with a lesser airflow turning angle is installed in the section with the larger airflow velocity, and the section with a larger airflow turning angle is installed in the section with the lesser airflow velocity. A combination of the known and proposed design features provides a possibility to reduce the total air pressure loss and, accordingly, the loss of power consumed by a drive unit and the blower unit, the overall dimensions of the wind tunnel, and materials consumption in constructing the wind tunnel.

using, in the wind tunnel circuit, turning bends with turning guts for turning airflow at 60 degrees. This design feature provides a possibility to reduce the air pressure loss coefficient for the turning bends and the materials consumption in constructing the wind tunnel.

The concept of the invention is illustrated by the schematic diagram of the proposed wind tunnel shown in FIG. The preferred embodiment of the inventive wind tunnel comprises a confuser (1), a test section (2) connected to the confuser (1), a diffuser (3) connected to the test section (2), a first turning bend (6), connected to the diffuser (3), a diffuser (4) for the return channel connected to the first turning bend (6), a second turning bend (7) connected to the diffuser (4), a blower unit (10) connected to the second turning bend (7), a return channel (5) connected to the blower unit (10), a third turning bend (8) with its first end connected with the return channel (5) and with its second end connected to the confuser (1), so that forming a closed loop.

The preferred embodiment of the wind tunnel comprises a number of turning guts (9) including: a first turning gut with an airflow turning angle of substantially 60 degrees installed in the first turning bend (6), a second turning gut and a third turning gut for turning the airflow at substantially 120 degrees installed in the second turning bend (7), a fourth turning gut, a fifth turning gut, and a sixth turning gut for turning the airflow at substantially 180 degrees installed in the third turning bend (8).

OPERATION OF THE PREFERRED EMBODIMENT

The proposed wind tunnel operates as follows. The blower unit (10) produces pressure difference, under which air in the wind tunnel circuit moves at the counterclockwise direction (as shown on FIG.). The air passes through the confuser (1), which is designed for accelerating the airflow and leveling the distribution of air velocities over the tunnel's cross-section, the test section (2), the diffuser (3) for decelerating the airflow and partially restoring the airflow full pressure, the first turning bend (6) for turning the air flow, the return channel diffuser (4) for additionally decelerating the airflow and partially restoring the airflow full pressure, the second turning bend (7) for turning the air flow, the blower unit (10) for increasing the airflow pressure to the full pressure, the return channel (5) for decelerating the airflow and partially restoring the airflow full pressure, and the third turning bend (8) for turning the airflow, and then enters the confuser (1).

REFERENCES

1. S. M. Gorlin, I. I. Slezinger. Aeromechanic Measurements (Techniques and Instruments), M., Nauka, 1964. 2. Wind Tunnels and Gas-Dynamic Installations of the NASA Eims Institute, Issue No. 450 G, Central Aerohydrodynamics Institute, 1974. 3. I. L. Povkh, Aerodynamic Experiment in Machine-Building Industry, M., Mashinostroenie. 1965.

The invention claimed is:

1. A return-flow wind tunnel comprising
a confuser,
a test section,
at least one diffuser,
at least one return channel,
a blower unit, and
at least two turning bends including a first turning bend and a second turning bend,
wherein said confuser, test section, at least one diffuser, at least one return channel, blower unit, and at least two turning bends being interconnected in a closed loop, and at least the first turning bend and the second turning bend having different airflow turning angles and arranged so that the turning bend with a minor airflow turning angle is installed in the section with larger airflow velocity, and the turning bend with a larger airflow turning angle is installed in the section with lesser airflow velocity.

2. The wind tunnel according to claim 1, wherein
said at least two turning bends including a third turning bend,
each of the turning bends comprising
at least one turning gut, designed so that the first turning bend containing one turning gut for turning the airflow at 60 degrees, the second turning bend containing two turning guts for turning the airflow at 120 degrees, and the third turning bend containing three turning guts for turning the airflow at 180 degrees.

\* \* \* \* \*